(12) United States Patent
Fang et al.

(10) Patent No.: US 6,474,838 B2
(45) Date of Patent: Nov. 5, 2002

(54) ARTIFICIAL LIGHTING APPARATUS FOR YOUNG PLANTS USING LIGHT EMITTING DIODES AS LIGHT SOURCE

(75) Inventors: Wei Fang, No. 1, Sec. 4, Lo-Szu-Fu Rd., Taipei (TW); Rueychi Jao, Taipei Hsien (TW); Den Hua Lee, 4F-15, No. 126, Sheng-Li Rd., Hsinchu (TW)

(73) Assignees: Wei Fang, Taipei (TW); Den Hua Lee, Hsinchu (TW)

( * ) Notice: Subject to any disclaimer, the term of this patent is extended or adjusted under 35 U.S.C. 154(b) by 0 days.

(21) Appl. No.: 09/837,170

(22) Filed: Apr. 19, 2001

(65) Prior Publication Data

US 2001/0048598 A1 Dec. 6, 2001

(30) Foreign Application Priority Data

May 30, 2000 (TW) ...................................... 89209210 U

(51) Int. Cl.$^7$ ................................................. F21V 9/02
(52) U.S. Cl. ........................ 362/231; 362/805; 362/800
(58) Field of Search ............................ 362/1, 226, 231, 362/251, 805, 563, 391, 2, 800, 250; 47/17, DIG. 6, 58.1

(56) References Cited

U.S. PATENT DOCUMENTS

| 4,396,872 | A | * | 8/1983 | Nutter | 315/308 |
| 5,012,609 | A | * | 5/1991 | Ignatius et al. | 47/DIG. 6 |
| 5,660,461 | A | * | 8/1997 | Ignatius et al. | 362/241 |
| 6,135,615 | A | * | 10/2000 | Lee | 362/226 |
| 6,312,139 | B1 | * | 11/2001 | Baker et al. | 362/250 |

* cited by examiner

Primary Examiner—Sandra O'Shea
Assistant Examiner—Hargobind S Sawhney
(74) Attorney, Agent, or Firm—Birch, Stewart, Kolasch & Birch, LLP

(57) ABSTRACT

An artificial lighting apparatus for young plants that includes at least one electric track and a plurality of lamps. The lamps are detachably mounted on the electric track. Each of the lamps includes a plurality of first light emitting diodes, a plurality of second light emitting diodes and a mounting box. The first and second light emitting diodes are alternately arranged. The electric track supplies the lamps with power to light the first and second light emitting diodes. The driver provides the controlling capability on light quantity, quality, frequency and duty ratio.

7 Claims, 9 Drawing Sheets

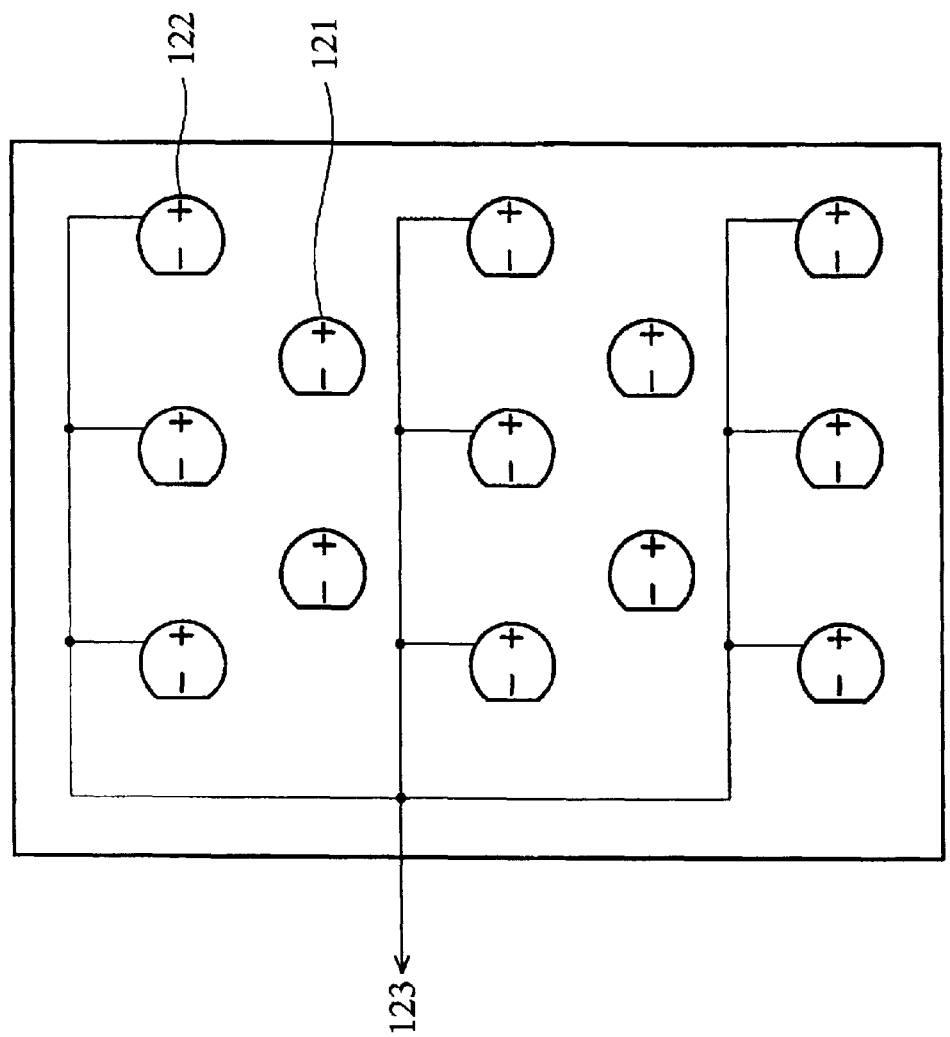

ARTIFICIAL LIGHTING APPARATUS FOR YOUNG PLANTS USING LIGHT EMITTING DIODES AS LIGHT SOURCE

BACKGROUND OF THE INVENTION

1. Field of the Invention

The present invention relates in general to an artificial lighting apparatus using high intensity red and blue light emitting diodes as a mixed light source for young plants, especially the plantlets growth in tissue culture vessel. During the lightperiod provided to the plant, the light quantity, light quality, duty ratio and frequency of the mixed light source of the present invention are adjustable.

2. Description of the Related Art

In the past, tubular fluorescent lamps (TFLs) were used as artificial light sources in plant tissue culture. However, TFL has problems including heat generation, easily decay, fixed light quality, short life span and flickering. Light emitting diodes (LEDs) have no excess heat problem so that LEDs can be arranged very close to the cultured plant to save culturing space. In addition, LEDs have the advantages of a long life span and low power consumption. Therefore, the research in culturing plants with LEDs has been proceeding. In 1992, Hoenecke, et al. successfully cultured vegetables by high intensity red LEDs (Hoenecke, M. E., R. J. Bula, and T. W. Tibbitts, 1992, Importance of 'Blue' photon levels for lettuce seedlings grown under red-light-emitting diodes, HortScience 27 (5) :427–430). In 1993, blue LEDs were successfully developed. In 1996, Okamoto et al. used high intensity red LEDs and blue LEDs to culture plants, with the quantum ratio of 2:1 for red light/blue light (Okamoto, K., T. Yanagi and S. Takita, 1996, Development of plant growth apparatus using blue and red LED as artificial light source, Acta Hort., 440 :111–116). Also in 1996, Yanagi et al. used blue LEDs (170 $\mu$mol/m$^2$/s) to culture lettuce (Yanagi, T., K. Okamoto and S. Takita, 1996, Effects of blue, red and blue/red lights of two different PPF levels on growth and morphogenesis of lettuce plants, Acta Hort, 440 :117–122). The dry weight of the cultured lettuce using pure blue light was less than that of the lettuce cultured by pure red light or red/blue light. Nevertheless, the cultured lettuce was short and healthy.

SUMMARY OF THE INVENTION

All the prior researches were made on a small scale, while the present invention is provided for the purpose of mass production. The present invention provides a plant-growing bench including at least one electric track and a plurality of lamps. The lamps, named LEDsets, are detachably mounted on the electric track. Each of the LEDset includes a first type of light emitting diodes, a second type of light emitting diodes and a mounting box. The two types of light emitting diodes are alternately arranged. The electric track supplies the LEDsets with power to light the light emitting diodes.

BRIEF DESCRIPTION OF THE DRAWINGS

The present invention can be more fully understood by reading the subsequent detailed description and examples with references made to the accompanying drawings, wherein:

FIGS. 7a–7c show wiring diagrams to the arrangement of FIG. 3.

DETAILED DESCRIPTION OF THE PREFERRED EMBODIMENT

Figure 1:
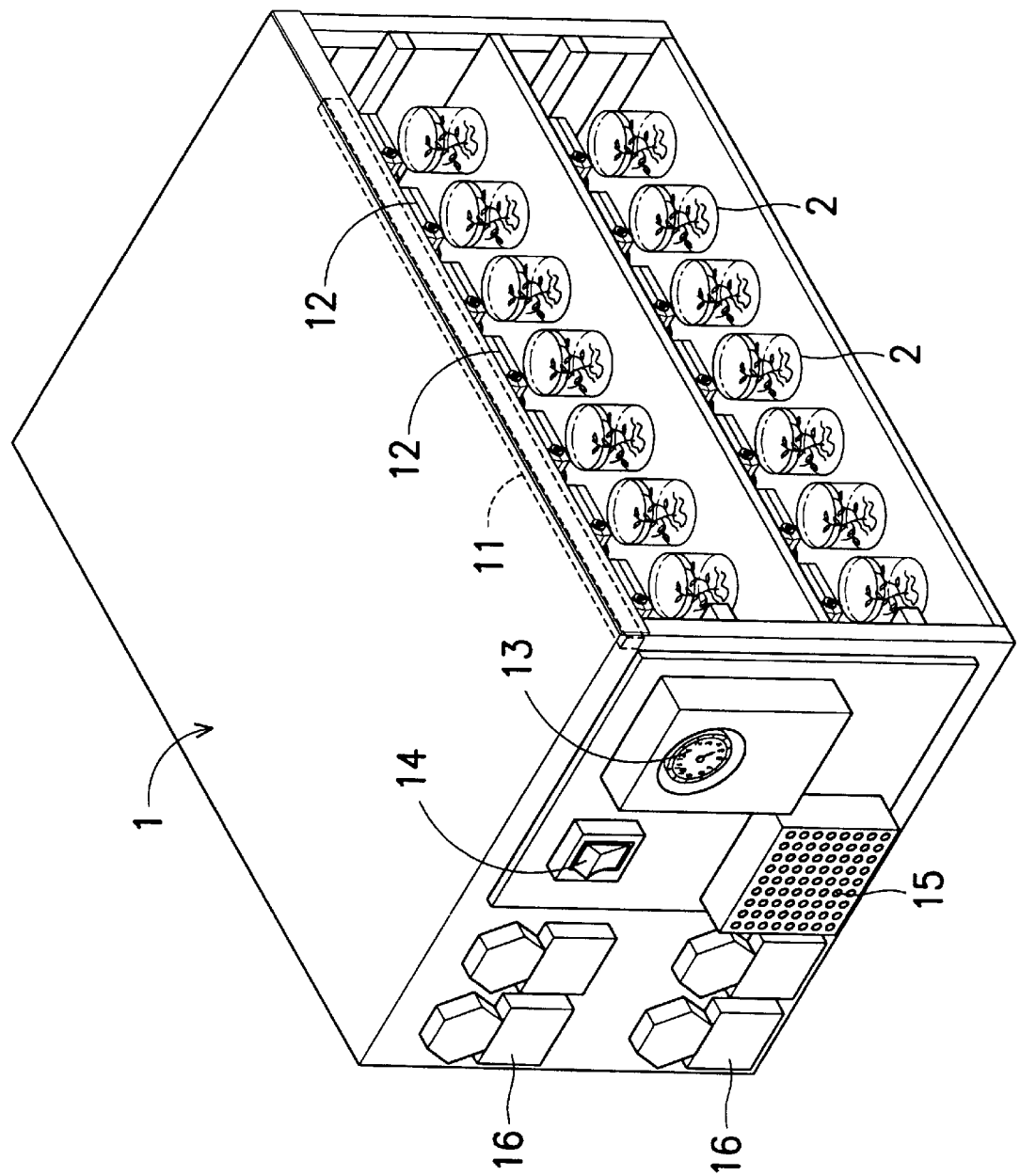
FIG. 1 is a perspective diagram of a plant-growing bench equipped with the present invention and related controlling device.

Referring to FIG. 1, a plant-growing bench 1 of the present invention can be partitioned into a plurality of layers. On the ceiling of each layer are mounted 3-wire electric tracks 11, while on each 3-wire electric track 11 are mounted LEDsets 12. Each LEDset 12 is a mixed light source including high intensity red and blue LEDs mounted on a circuit board attached to a box. Cultured plantlets 2 are provided in tissue culture vessels 2 under the LEDset 12. Furthermore, a timer 13, a switch 14, an AC/DC converter 15 and several drivers 16 are mounted on a sideboard of the plant-growing bench 1. The AC/DC converter 15 supplies the LEDsets 12 with power through the 3-wire electric tracks 11 to illuminate the plantlets in the vessels 2. The switch 14 is used for manually turning on/off the power. When the power is on, the timer 13 is used for the control of photoperiod. A photoperiod of $^{16}/_8$ means turn on the light for 16 hours daily. The first number is the duration hours of the light period and the second number is the duration hours of the dark period. The driver 16 is used for adjusting the voltage, current, frequency and duty ratio by the direct current provided to the LEDsets 12, thereby controlling the light quantity, light quality and lighting cycle of the LEDsets 12 during the light-period. The LEDsets 12, electric tracks 11 and driver 16 are described in detail as follows.

Figure 2:
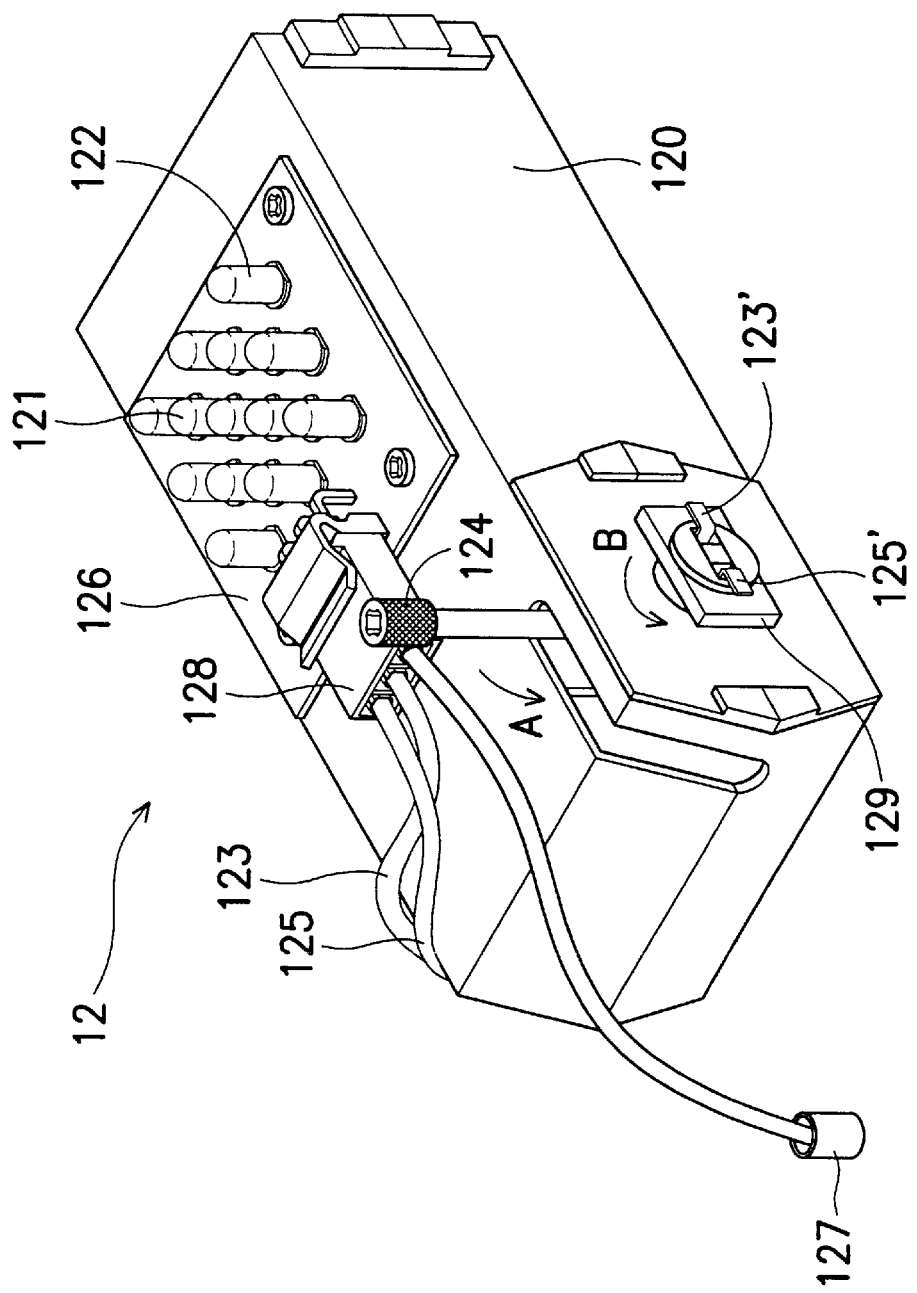
FIG. 2 is a perspective diagram of a LEDset of the present invention.
Figure 3:
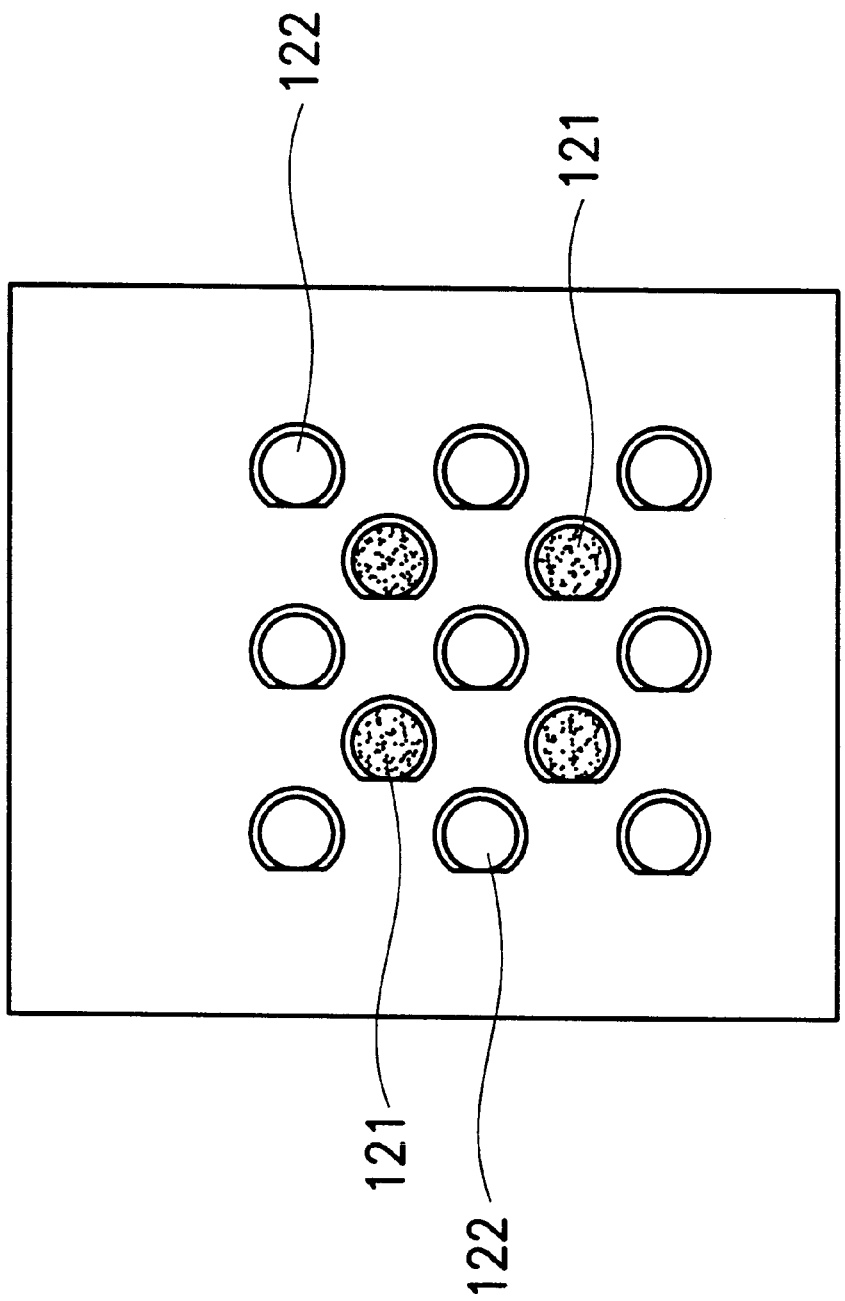
FIG. 3 depicts an arrangement of LEDs on a circuit board of the lamp of the present invention.

Referring to FIGS. 2 and 3, the LEDset 12 has a mounting box 120 and a circuit board 126 on the box 120. High intensity red LEDs 122 and blue LEDs 121 are alternately mounted on the circuit board 126. The blue LEDs 121 are spaced apart by the same distance. Similarly, the high intensity red LEDs 122 are spaced at the same distance apart. It is understood that lighting the high intensity red LEDs 122 and lighting the blue LEDs 121 require different voltages, thus requiring four wires in total to supply power. However, the present invention uses a common ground wire for the high intensity red LEDs 122 and the blue LEDs 121, thereby reducing the number of wires to three. Referring to FIG. 2, the high intensity red LEDs 122 and the blue LEDs 121 are connected to three wires 123, 125, 127 through the circuit board 126 and connector 128, wherein the wires 123, 125 are power lines and the wire 127 is the common ground line. Furthermore, an operating handle 124 and a locking element 129 are mounted on the box 120 of the LEDset 12. When the user pushes the operating handle 124 in direction A, the locking element 129 is rotated in direction B. Two electrodes 123', 125' are provided on the locking element 129 and electrically connected to the wires (power lines) 123, 125.

Figure 7B:
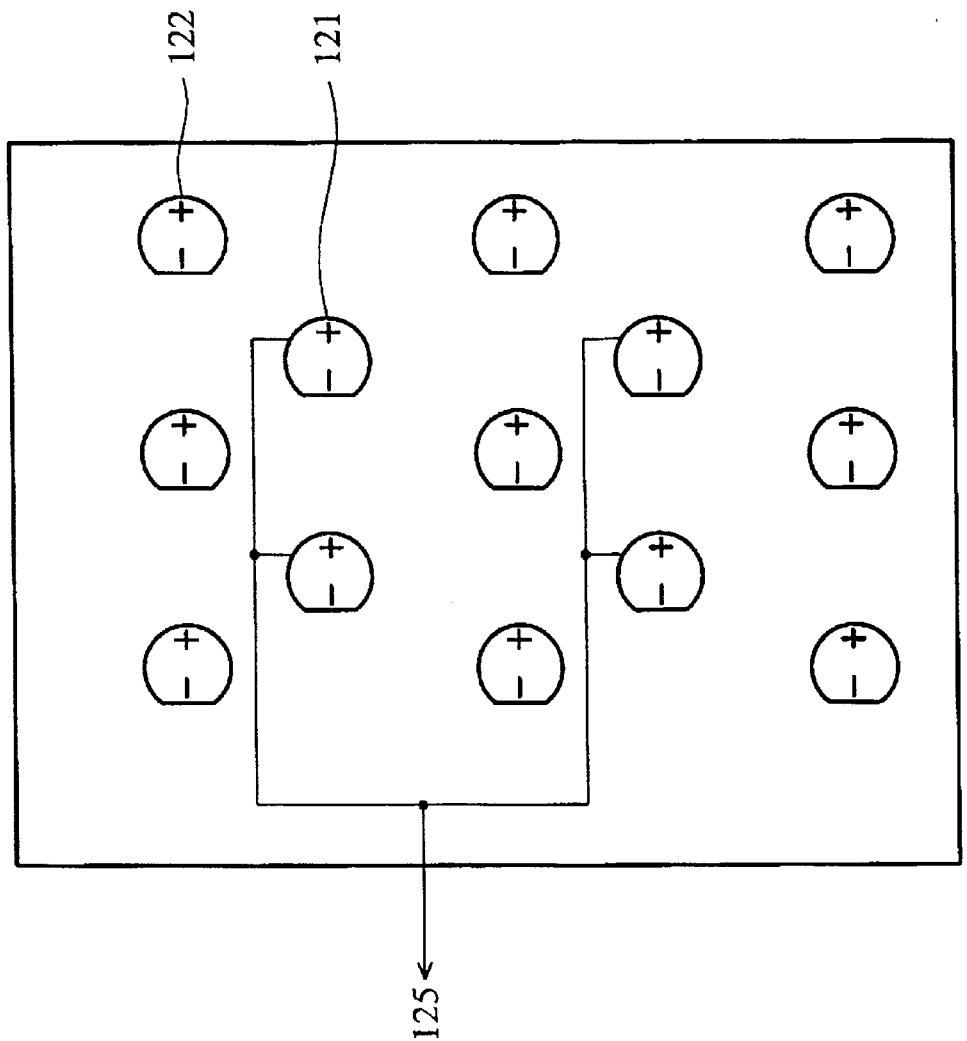
Figure 7C:
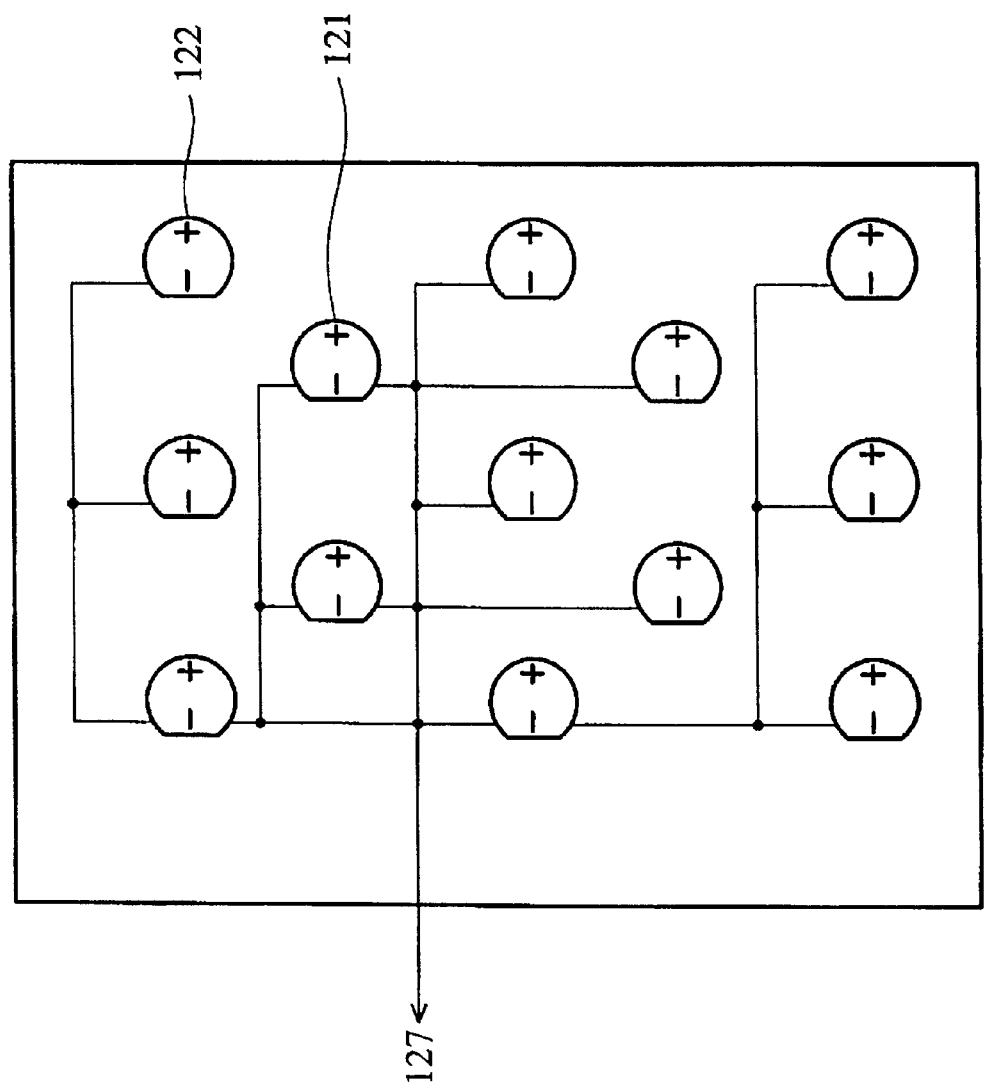

FIG. 7a is a wiring diagram showing a connection of anodes for red LEDs. Each anode "+" of the red LEDs 122 is connected to the power line 123. FIG. 7b is a wiring diagram showing a connection of anodes from blue LEDs. Each anode + of the blue LEDs 121 is connected to the power line 125. FIG. 7c is a wiring diagram showing a connection of cathodes for red and blue LEDs. Each cathode "−" of the red and blue LEDs 122 and 121 are connected to the common ground line 123.

Figure 4:
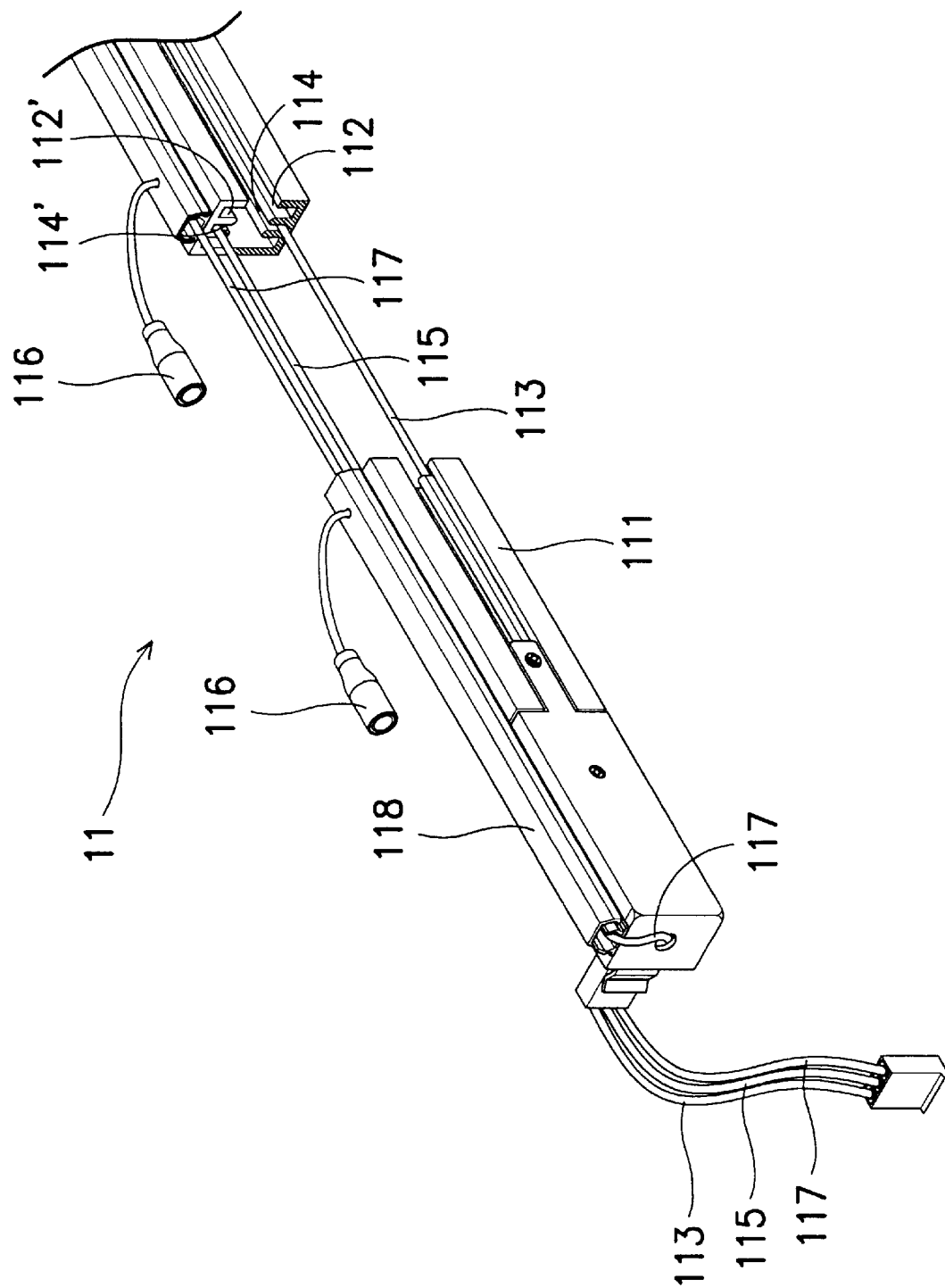
FIG. 4 is a perspective diagram of a 3-wire electric track of the present invention, which is modified from a commercially available 2-wire electric track.

FIG. 4 is a perspective diagram of the electric track of the present invention, wherein a portion of the electric track is cut away to show the inside of the electric track. The electric track 11 has an elongated body 111 and a pair of longitudinal engaging grooves 112, 112' and receiving grooves 114, 114' provided in the body 111. Bare copper wires 113, 115 are received in the receiving grooves. An elongated cover 118 is fixed to the body 118. The common ground wire 117 is received in the cover 118 and laterally connected to a plurality of connectors 116 outside the cover 111.

Figure 5:
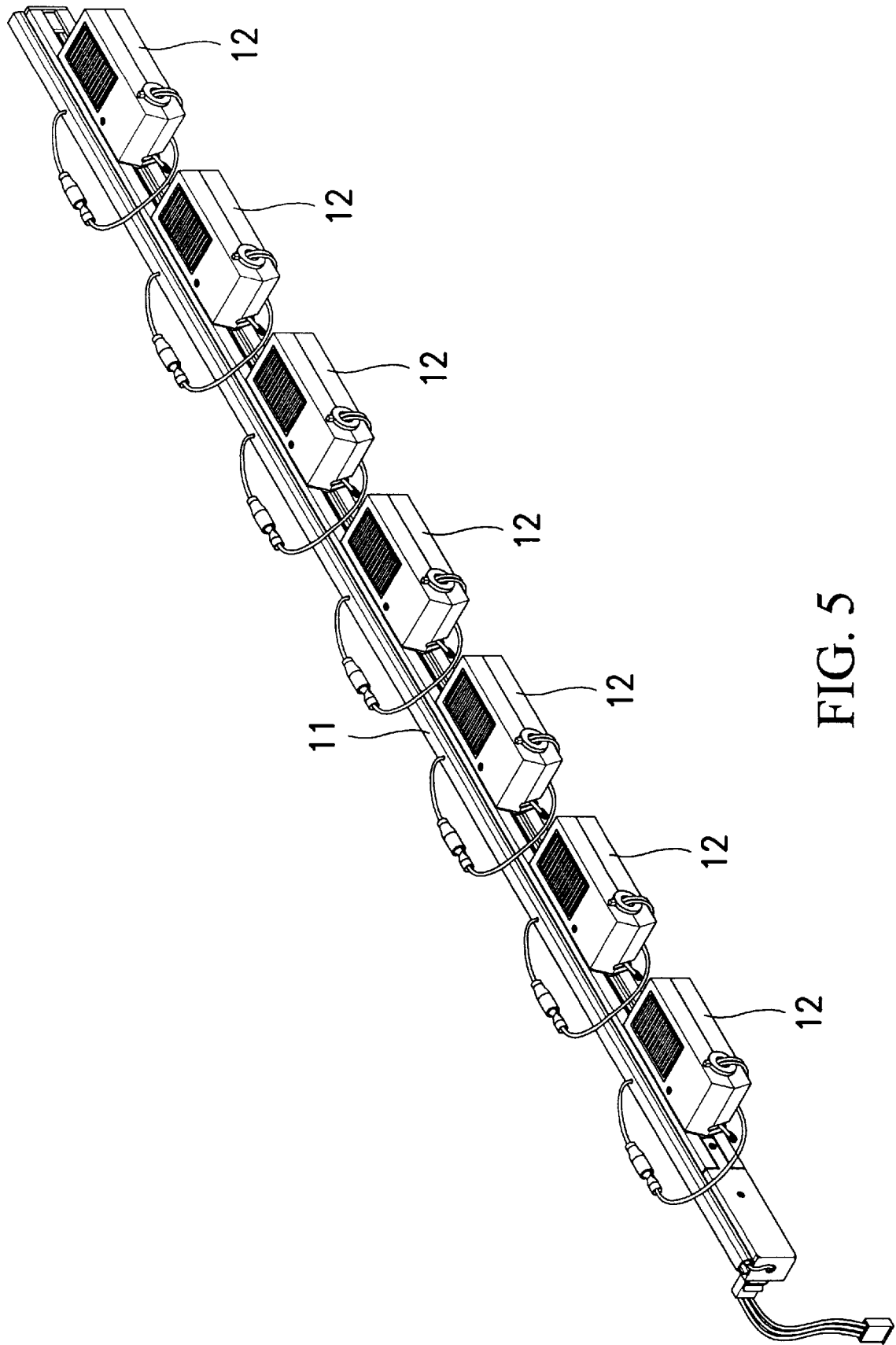
FIG. 5 depicts the 3-wire electric track of the present invention with LEDsets mounted thereon.

FIG. 5 depicts the electric track with LEDsets mounted thereon. The electric track 11 and the LEDsets 12 are assembled together in the following manner:

(1) The user puts the locking element 129 of the LEDset 12 in the electric track 11 and then pushes the handle 124 of the LEDset 12 to rotate the locking element 129 so that the LEDset 12 and the electric track 11 are locked together by the locking element 129. The electrodes 123', 125' of the LEDset 12 follow the locking element 129 to rotate and then physically contact the bare copper wires 113, 115.

(2) The user connects the ground wire 127 of the LEDset 12 to the connector 116 of the electric track 11.

Then, the electric track 11 can supply the LEDset 12 with power.

Figure 6:
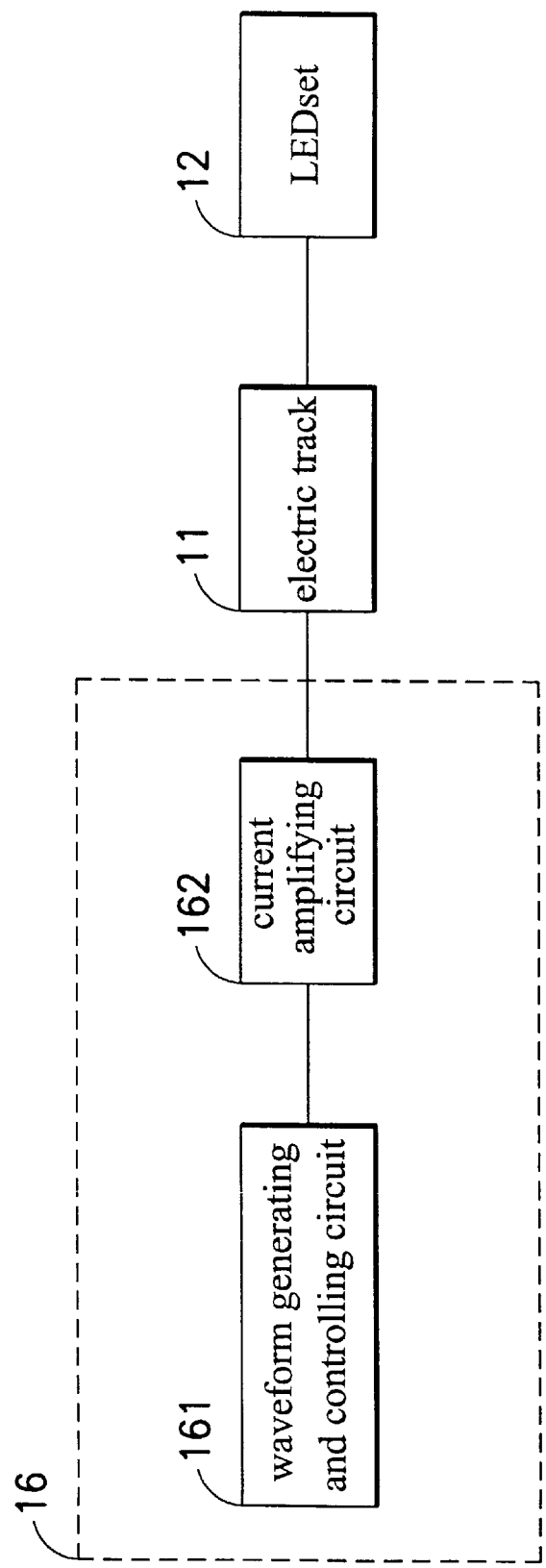
FIG. 6 is a block diagram of a driver of the artificial lighting apparatus of the present invention.

Referring to FIG. 6, the driver 16 includes a waveform generating and controlling circuit 161 and a current amplifying circuit 162. The waveform generating and controlling circuit 161 outputs desired waveform (e.g. square waves, triangular waves, sine waves, cosine waves and pulses, etc.). Also, the waveform's amplitude, frequency and duty ratio are adjustable by the waveform generating and controlling circuit 161. Then, the waveform is amplified by the current-amplifying circuit 162 and sent to the LEDset 12 to control the LEDs' light quantity and lighting cycle. The current of different types of LEDs can be controlled separately, thus controlling the light quality.

The plant-growing bench of the present invention is developed for the purpose of mass-production. The plant-growing bench is partitioned into a plurality of layers. On the ceiling of each layer are mounted electric tracks, while on each electric track are mounted LEDsets for simultaneously culturing a large quantity of plantlets. Furthermore, the user can individually control the LEDs' light quantity, light quality and lighting cycle via the driver. Therefore, the plant-growing bench of the present invention is adapted for culturing various kinds of plantlets, wherein the best growth conditions for each are different. Furthermore, researchers can use the plant-growing bench of the present invention to find the best light quantity and light quality for the growths of various plantlets, and to assess the acceptable lighting cycles for saving the electric power and enhancing the photosynthetic efficiency. Furthermore, the lamps of the present invention are well designed so that mounting and dismounting the LEDsets on the electric tracks are fast and easy. That is of great advantage to the construction of a new plant factory and the maintenance of an existing plant factory.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An artificial lighting apparatus for young plants including:

at least one electric track having a first power line, a second power line and a common ground line;

a plurality of lamps detachably mounted on the at least one electric track and supplied with power by the at least one electric track, each of the lamps including a plurality of first light emitting diodes and a plurality of second light-emitting diodes, wherein the first and second light emitting diodes are alternately arranged, and the first power line and the common ground line are connected to the first light emitting diodes, and the second power line and the common ground line are connected to the second light emitting diodes.

2. An artificial lighting apparatus for young plants as claimed in claim 1, wherein the first light emitting diodes are high intensity red light emitting diodes, and the second light emitting diodes are blue light emitting diodes.

3. An artificial lighting apparatus for young plants as claimed in claim 1, wherein the at least one electric track further has an elongated body and an elongated cover, the elongated body has longitudinal receiving grooves inside to receive the first and second power lines, the elongated cover is fixed to the elongated body, and the common ground line is covered by the elongated cover.

4. An artificial lighting apparatus for young plants as claimed in claim 3, wherein each of the lamps further includes a box with the first and second types of light emitting diodes mounted on the box, a lever mounted on the box, and a locking element mounted on the box and actuated by the lever to lock the lamp and the at least one electric track together.

5. An artificial lighting apparatus for young plants as claimed in claim 1, further including a driver connected to the at least one electric track for individually controlling the firth light emitting diodes' and the second light emitting diodes' light quantity, light quality and lighting cycle 6. An artificial lighting apparatus for young plants as claimed in claim 5, wherein the driver includes a waveform generating and controlling circuit for outputting desired waveform, and a current-amplifying circuit for amplifying the waveform and sending the waveform to the lamp, thereby controlling the lamp's light quantity, light quality and lighting cycle.

7. An artificial lighting apparatus for young plants as claimed in claim 6, wherein the waveform's amplitude, frequency and duty ratio are adjustable by the waveform generating and controlling circuit.

* * * * *